(12) United States Patent
Brett et al.

(10) Patent No.: US 10,293,755 B2
(45) Date of Patent: May 21, 2019

(54) FOLDING HANDRAIL FOR WORK VEHICLE

(71) Applicant: Deere & Company, Moline, IL (US)

(72) Inventors: William A. Brett, Polk City, IA (US); Kevin A. Thelen, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 254 days.

(21) Appl. No.: 15/465,164

(22) Filed: Mar. 21, 2017

(65) Prior Publication Data

US 2017/0313255 A1 Nov. 2, 2017

Related U.S. Application Data

(60) Provisional application No. 62/328,773, filed on Apr. 28, 2016.

(51) Int. Cl.
| | | |
|---|---|---|
| *B60R 3/00* | (2006.01) | |
| *B60P 3/22* | (2006.01) | |
| *E04G 5/14* | (2006.01) | |
| *E04G 21/32* | (2006.01) | |

(52) U.S. Cl.
CPC .............. *B60R 3/005* (2013.01); *B60P 3/2205* (2013.01); *E04G 5/14* (2013.01); *E04G 21/3228* (2013.01)

(58) Field of Classification Search
CPC ......... B60P 3/2205; B60R 3/005; E04G 5/14; E04G 21/3228
See application file for complete search history.

(56) References Cited

U.S. PATENT DOCUMENTS

| | | | | |
|---|---|---|---|---|
| 4,909,483 A | * | 3/1990 | van Herpen | E04G 21/3233 256/59 |
| 5,749,436 A | * | 5/1998 | Satchwell, III | B60R 3/005 182/113 |
| 5,921,531 A | * | 7/1999 | Early | B61D 7/00 105/437 |
| 5,950,933 A | | 9/1999 | Balmer | |
| 6,045,157 A | * | 4/2000 | Poulin | B60R 3/005 182/113 |
| 7,174,993 B2 | * | 2/2007 | Lantz | B60R 3/005 182/106 |

(Continued)

FOREIGN PATENT DOCUMENTS

| | | | | |
|---|---|---|---|---|
| EP | 3281826 A1 | * | 2/2018 | ............ B60R 3/005 |
| FR | 2063453 A5 | * | 7/1971 | ............ B60R 3/005 |

(Continued)

*Primary Examiner* — Colleen M Chavchavadze
(74) *Attorney, Agent, or Firm* — Klintworth & Rozenblat IP LLP (57) ABSTRACT

A handrail system for a work vehicle has a handrail including a first rail member configured to extend in first direction and a second rail member coupled to the first rail member and configured to extend in a second direction substantially perpendicular to the first direction. The handrail system also has a fold structure configured to couple the handrail to the work vehicle and move the handrail between an upright position and a folded position with respect to the work vehicle. When in the folded position, the handrail has a support surface that is elevated along a central area of the handrail higher than at least one side of the handrail.

18 Claims, 12 Drawing Sheets

(56) References Cited

U.S. PATENT DOCUMENTS

| | | | |
|---|---|---|---|
| 7,841,644 B1* | 11/2010 | Ciarfello | B60R 3/005 |
| | | | 296/162 |
| 8,555,770 B2* | 10/2013 | Fuqua | B60R 3/005 |
| | | | 182/129 |
| 8,632,099 B2* | 1/2014 | Conny | B60R 21/02 |
| | | | 182/113 |
| 8,689,938 B2* | 4/2014 | Kenton | E04G 21/3233 |
| | | | 182/113 |
| 9,126,536 B2* | 9/2015 | Meacham | E04G 5/14 |
| 9,403,486 B2* | 8/2016 | May | B60R 3/005 |
| 9,487,145 B2* | 11/2016 | Koshy | E02F 9/0816 |
| 9,617,747 B2* | 4/2017 | Seto | E04G 21/3228 |
| 2003/0020253 A1* | 1/2003 | Albert Bosman | B60R 3/005 |
| | | | 280/164.1 |
| 2008/0041662 A1* | 2/2008 | Despres | E04G 21/3214 |
| | | | 182/113 |
| 2017/0073154 A1 | 3/2017 | Borkgren et al. | |
| 2017/0073155 A1 | 3/2017 | Borkgren et al. | |
| 2018/0266127 A1* | 9/2018 | Smith | E04G 21/3228 |

FOREIGN PATENT DOCUMENTS

| | | | | |
|---|---|---|---|---|
| FR | 3014126 A1 * | 6/2015 | | E04G 21/3228 |
| FR | 3022934 B1 * | 7/2016 | | E04G 21/3228 |
| FR | 3045086 A1 * | 6/2017 | | E04G 21/3228 |
| WO | WO-2007059771 A1 * | 5/2007 | | B60R 3/005 |

\* cited by examiner

FOLDING HANDRAIL FOR WORK VEHICLE

CROSS-REFERENCE TO RELATED APPLICATION(S)

This application claims priority to provisional application Ser. No. 62/328,773, filed Apr. 28, 2016.

STATEMENT OF FEDERALLY SPONSORED RESEARCH OR DEVELOPMENT

Not applicable.

FIELD OF THE DISCLOSURE

The present disclosure generally relates to work vehicles (e.g., agricultural dry nutrient applicators), and more particularly to a handrail system therefor.

BACKGROUND OF THE DISCLOSURE

Various work vehicles such as those used in the agriculture, construction, forestry, mining and other industries, have raised platforms for operators or other personnel to access various features of the machines or perform work functions associated with the machines. For example, to distribute materials (e.g., wet or dry fertilizers, pesticides, fungicides, insecticides, lime, compost, and so on) onto agricultural fields or crops, agricultural nutrient applicators commonly include an application system with a tank having one or more compartments for separately holding the different materials. It is common for an operator or technician to access the application system (e.g., to conduct maintenance procedures) via a raised platform mounted to the vehicle chassis.

SUMMARY OF THE DISCLOSURE

The disclosure provides a folding handrail system for a work vehicle, and a work vehicle having a folding handrail.

In one aspect, the disclosure provides a handrail system for a work vehicle. The handrail system includes a handrail having a first rail member configured to extend in a first direction and a second rail member coupled to the first rail member and configured to extend in a second direction substantially perpendicular to the first direction. The handrail system also has a fold structure configured to couple the handrail to the work vehicle and move the handrail between an upright position and a folded position with respect to the work vehicle. When in the folded position, the handrail has a support surface that is elevated along a central area of the handrail higher than at least one side of the handrail.

In another aspect, the disclosure provides a work vehicle with a folding handrail. The work vehicle includes a vehicle frame and a platform mounted at a top side of the vehicle frame. The handrail system has a handrail positioned near the platform with a first rail member extending in a first direction and a second rail member coupled to the first rail member and extending in a second direction substantially perpendicular to the first direction. The handrail system has a fold structure configured to move the handrail between an upright position and a folded position with respect to the work vehicle. When in the folded position, the handrail has a support surface that is elevated along a central area of the work vehicle higher than at least one side of the work vehicle.

The details of one or more embodiments of the disclosure are set forth in the accompanying drawings and the description below. Other features and advantages of the disclosure will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed work vehicle folding handrail system, as shown in the accompanying figures of the drawings described briefly above. Various modifications to the example embodiments may be contemplated by one of skill in the art.

In certain embodiments, a handrail system is disclosed that includes a handrail with multiple rail members that are interconnected (e.g., monolithically or as an assembly) to provide a structure that may be grasped by a person standing on a raised platform of the work vehicle (e.g., such as on a tank of an applicator system), and may further gate off or enclose the raised platform from one or more elevated sides of the work vehicle. When a fold structure couples the handrail to the work vehicle, one or more of the rail members may extend in a direction that is substantially in line with a direction of travel of the work vehicle, and one or more other rail members may extend in another direction that extends, when the handrail is in the folded positioned, substantially between lateral sides of the work vehicle.

In this regard, reference is made herein to various dimensional directions (e.g., first, second and third directions) in describing the arrangement of the handrail and the rail members of the handrail. It will be understood that such directions pertain to the primary dimension (e.g., long axis) of a rail or other member. Further, as noted, these directions may be given a reference frame with respect to a travel direction of the work vehicle. It will further be understood that such directions need not be precisely aligned with the travel direction reference frame (i.e., may being not truly parallel with or perpendicular thereto), and that one or more of the directions may change as the handrail or components thereof change orientations (i.e., the handrail may change orientations with respect to a reference frame). As an example, a "first" direction may correspond substantially to the fore-aft travel direction of the work vehicle, and a "second" direction may correspond substantially to direction that is generally perpendicular (i.e., orthogonal or normal) to the first direction. In the case where the handrail is arranged so that the handrail folds laterally (i.e., perpendicular to the travel direction), the second direction may correspond to a generally upright or vertical dimension relative to the work vehicle when the handrail is upright and may also correspond to a generally lateral or horizontal direction when the handrail is folded (as well as various oblique planes between the upright and folded positions). A "third" direction may correspond to a direction that is perpendicular to the first direction, or in this context the travel direction of the work vehicle. The third direction may also be perpendicular to the second direction, and thus, the third direction may take a generally lateral/horizontal direction or a generally upright/vertical direction depending on whether the handrail is folded or upright. Still further, reference herein to "upright," "vertical," "lateral," or "horizontal" does not necessarily refer to a geostationary reference frame or require precise alignment with such a reference frame.

At a central area of the handrail or the work vehicle, the handrail may have one or more elevated support surfaces for supporting various features of the work vehicle. The support surfaces may be flat or may be vertically higher relative to one or more sides of the rail members or one or more sides of the work vehicle. In certain embodiments, the support surfaces are defined by one or more dividers, alternatively the rail members may provide the support surfaces in which case the dividers may be omitted or fixed to the work vehicle (e.g., in a spaced apart arrangement vertically beneath the folded handrail, thus acting as a rest or backstop for the folded handrail). The dividers may also have planar (or other) partition walls to segregate areas of the work vehicle and upper edges of the walls may define the support surfaces, which may be inclined and curved in one direction (e.g., the lateral direction) such that, when the handrail is in the folded position, the support surfaces have decreasing heights in one direction (e.g., the laterally outward direction). By way of example, the dividers may take on triangular, trapezoidal, hemispherical or other arcuate segments, and other geometric configurations.

The handrail system may include multiple rail members extending in the travel direction, including one or more that are spaced apart in the upright direction (when the handrail is upright), and multiple rail members extending in the upright direction (when the handrail is upright) and spaced apart in the travel direction. Multiple dividers may be arranged between consecutive (upright) rail members (when the handrail is upright) so that the long dimension of each divider extends in the upright direction. In this way, when the handrail is folded (perpendicular to the travel direction), the long dimension of the dividers will extend laterally across the work vehicle, in some cases across the full length or width of the work vehicle.

In certain embodiments, one or more of the dividers may be formed in multiple (e.g., two) parts or portions. For example, each divider may have a first divider portion and a second divider portion. The first divider portion may be fixed with respect to the work vehicle and the second divider portion may be mounted to at least one of the rail members such that it is movable with the handrail with respect to the work vehicle. Increased (e.g., full-width of the work vehicle) partitioning and/or feature support may thus be established by the combination of the first and second divider portions when arranged in alignment with one another along a given direction (e.g., in the lateral direction).

While the folding handrail may be useful in various work vehicles, in certain embodiments a handrail system is disclosed that is adapted for coupling to a top side of an application system of an agricultural dry nutrient applicator with one or more material holding tanks. The handrail may be mounted to the work vehicle proximate a raised platform (e.g., a catwalk) or other feature of the application system (e.g., a grate) near the tank(s). For example, the handrail may be mounted to the work vehicle such that the rail members are positioned substantially along one or more sides or the center of the tank(s). The divider(s) may partition multiple tanks or multiple compartments of a single tank. Further, the handrail, specifically the support surface(s) (e.g., edges of one or more dividers) may serve to support a covering for the tank(s). In the case of flexible coverings (e.g., sheets, tarps and so on), the elevated center area and lower side or sides of the handrail may serve to keep the covering suspended or draped over the tank(s) (and out of contact with grating or material) and allow for run-off of liquids (e.g., rain water) without pooling on the covering.

Referring now to the drawings, one or more example embodiments of the handrail system will be described in detail in connection with an example work vehicle in the form of a self-propelled agricultural dry nutrient applicator. The illustrated machine is not limiting as the disclosed handrail may be incorporated in various other work vehicles, including other applicator vehicles as well as various self-propelled or towed machines used in the agriculture, construction, forestry, mining and other industries.

As mentioned, FIGS. 1-6 illustrate an example agricultural dry nutrient applicator 20 according to one embodiment. The illustrated dry nutrient applicator 20 is self-propelled and has a frame 25 that is supported by one or more front ground-engaging devices 30 (e.g., wheels, tracks) and a pair of rear ground-engaging devices 35 (e.g., wheels, tracks). Alternatively, the agricultural dry nutrient applicator 20 may be a pull-behind type machine (not shown) with no front ground-engaging devices. An operator station 40 is mounted to the frame 25 at a forward end of the machine.

An application system 45 is also mounted to the frame 25 and positioned rearward of the operator station 40 in a direction opposite of a direction of forward travel 50. The application system 45 has a boom arrangement 47 for distributing dry material (not shown) and one or more material holding tanks (e.g., tank 55) for holding dry material. The tank 55 has a front side 60, a left side 65, a right side 70, a rear side 75, and a top side 80. The illustrated tank 55 has a first compartment 85 and a second compartment 90. Alternatively, the tank 55 may have just one compartment or more than two compartments (not shown). A plurality of grates 95 are coupled to the top side 80 of the tank 55. Dry material may be added to the tank 55 by passing the dry material through the grates 95 or by removing the grates 95 and then replacing the grates 95 after the dry material is added.

A handrail system 100 is adapted for coupling to the top side 80 of the tank 55 of the application system 45. The handrail system 100 includes a handrail 105 and a fold structure 110. The handrail 105 may be segmented into discreet sections, such that the handrail 105 may have multiple sections including a first handrail portion 107, a second handrail portion 108, and a third handrail portion 109. Additional handrail portions are contemplated by this disclosure. Alternatively, the handrail 105 may be one continuous component, such as shown in the FIGS. 7-12. For simplicity, the numbers referenced in this description will be the same for both illustrated examples, however, a prime suffix has been added to the reference numbers shown in FIGS. 7-12.

In either example embodiment (and others), the handrail 105, or its constituent sections or portions, may be formed as an assembly of rail members (e.g., rails joined via mechanical fasteners or various bonding or welding techniques), or the handrail 105, or its constituent sections or portions, may be formed as one or more monolithic structures (i.e., single-piece construction) formed using a suitable manufacturing process (e.g., molding, casting and the like). Further, in either case, the handrail 105 may include rail members (again as separate assembled features or integral features of a monolithic structure) that combine to form an interconnected rail arrangement including one or more first rail members 105a that primarily extend in a first direction and one or more second rail members 105b that primarily extending in a second direction.

Figure 4:
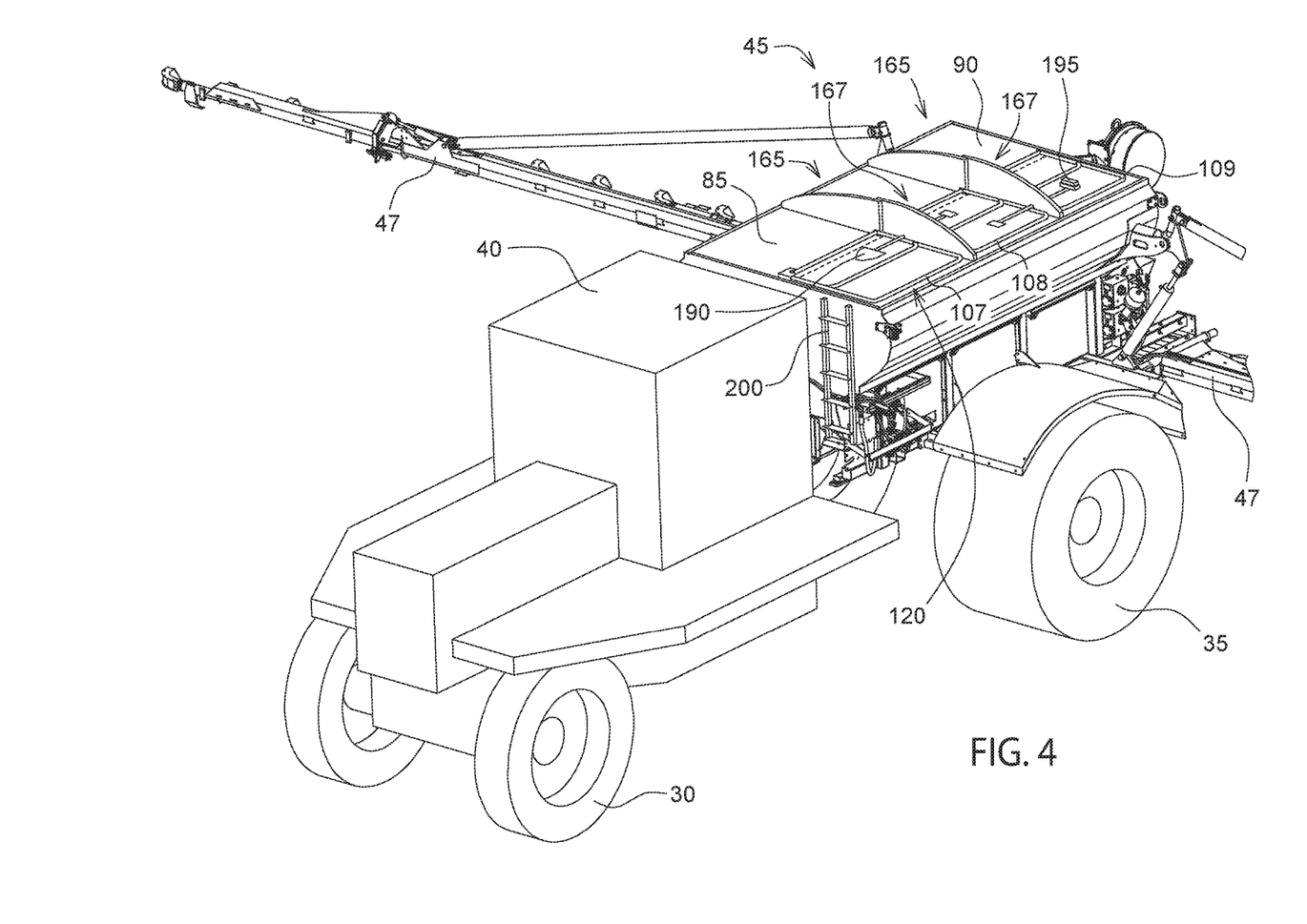
FIG. 4 is a simplified perspective view of the work vehicle of FIG. 1, showing the handrail system in a folded position.
Figure 5:
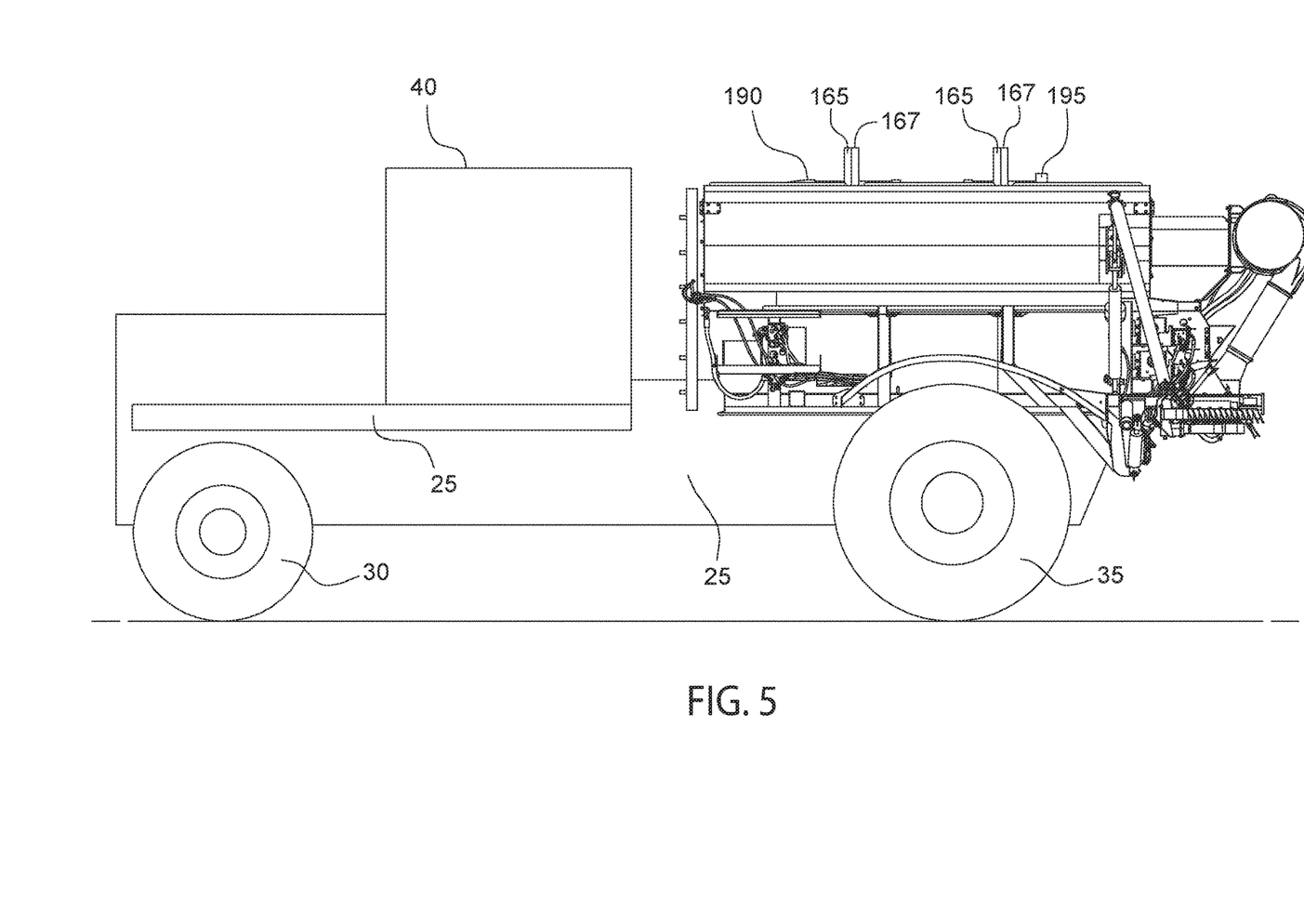
FIG. 5 is a side view thereof.
Figure 6:
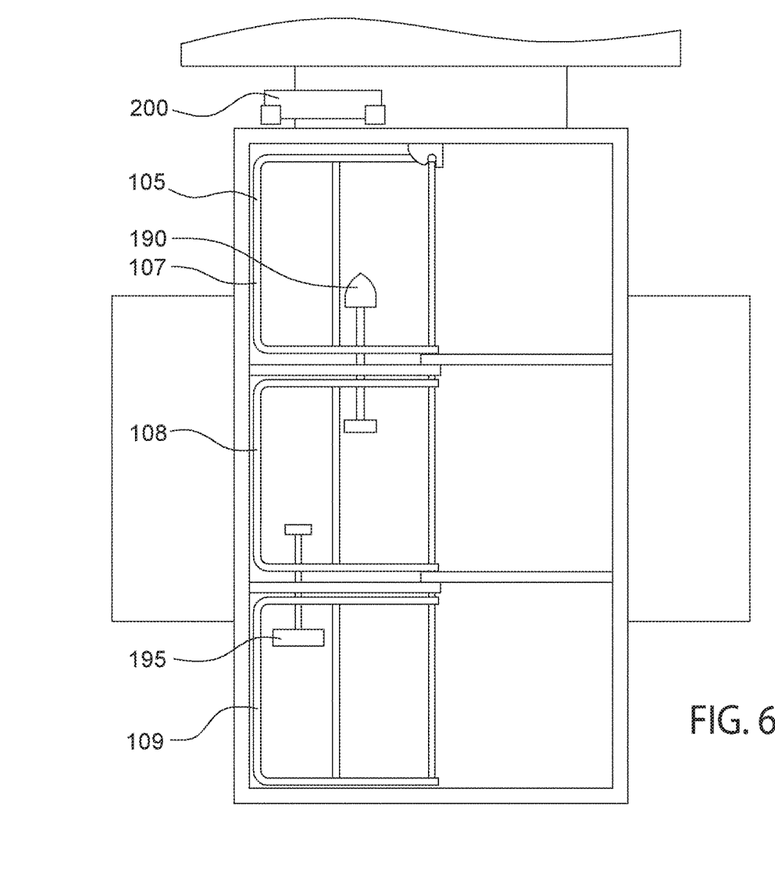
FIG. 6 is a partial top view thereof.
Figure 10:
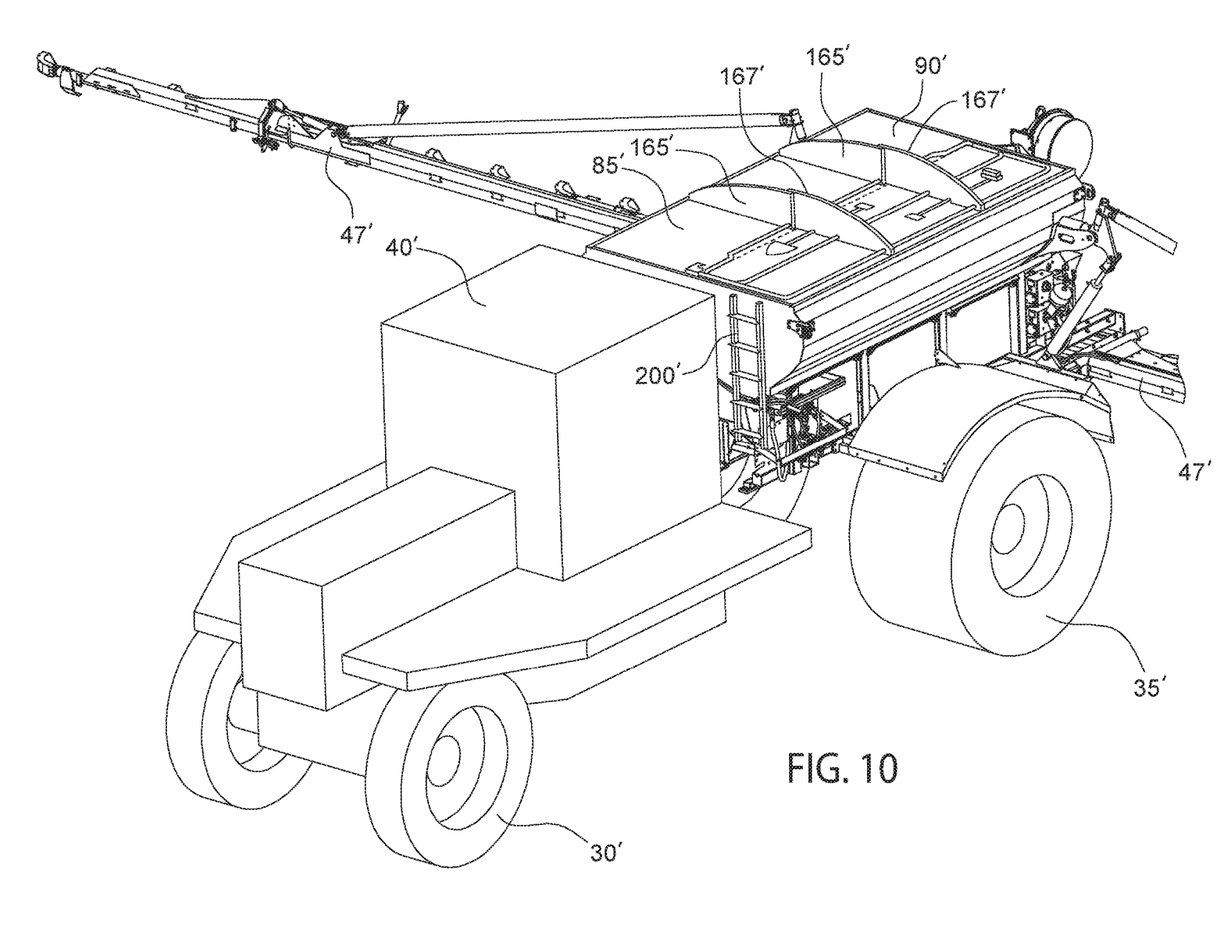
FIG. 10 is a simplified perspective view of the work vehicle of FIG. 7, showing the handrail system in a folded position.
Figure 11:
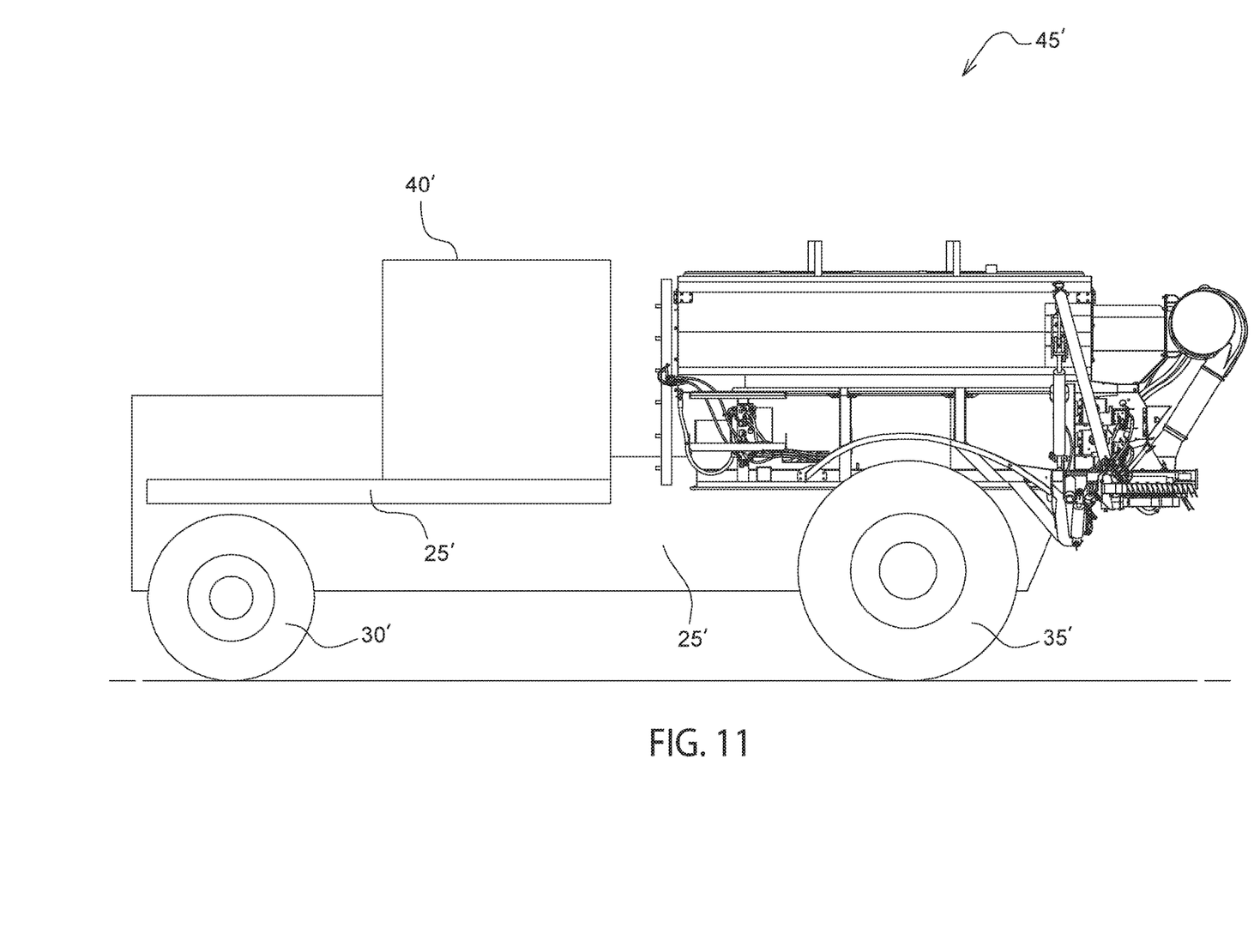
FIG. 11 is a side view thereof.
Figure 12:
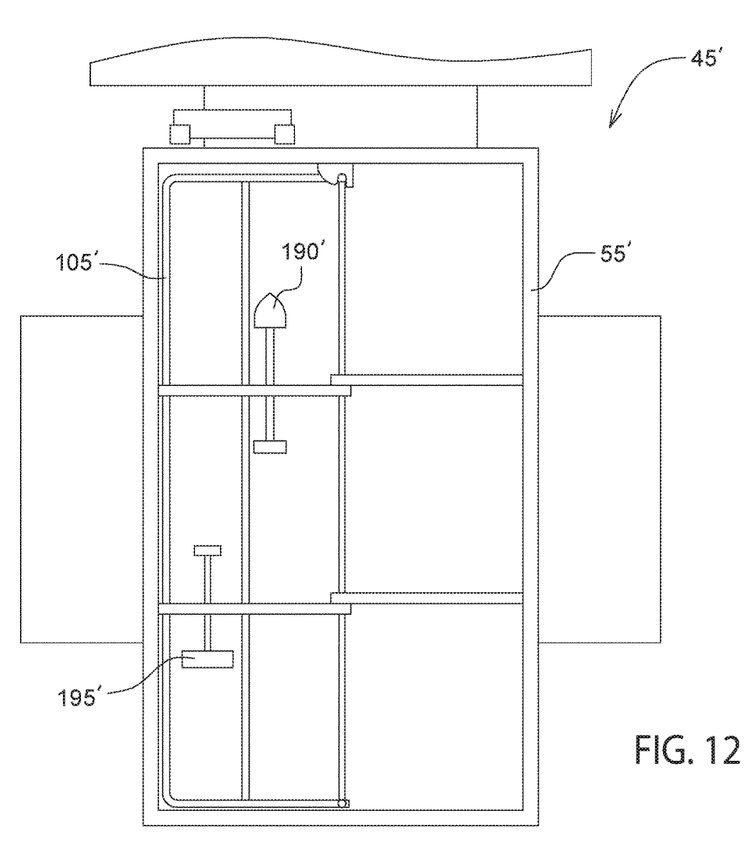
FIG. 12 is a partial top view thereof.

In the illustrated examples, the first rail members lie substantially in one or more planes that are parallel to the grates 95 (or a horizontal plane when the agricultural dry nutrient applicator 20 is on level ground) and substantially extend in the travel direction 50 of the agricultural dry nutrient applicator 20, and thus, in some cases the first direction may be the same as the travel direction 50. Further, the first rail members extend in the first direction throughout operation of the handrail system 100 during use. The second rail members lie substantially in one or more planes that are perpendicular to the planes of the first rail members and generally aligned in the travel direction 50 of the agricultural dry nutrient applicator 20. In the position of the handrail 105 shown in FIG. 1, for example, the second rail members (and the second direction) may thus be an upright orientation, and may be a vertical orientation in some cases. Again, the second rail members (and the second direction) may be considered an upright, or possibly a vertical, orientation in the position shown in FIGS. 1 and 7. As will be described, the second rail members (and the second direction) take on a generally flat, lateral orientation when in other positions (e.g., when folded as shown in FIGS. 4 and 10).

Figure 1:
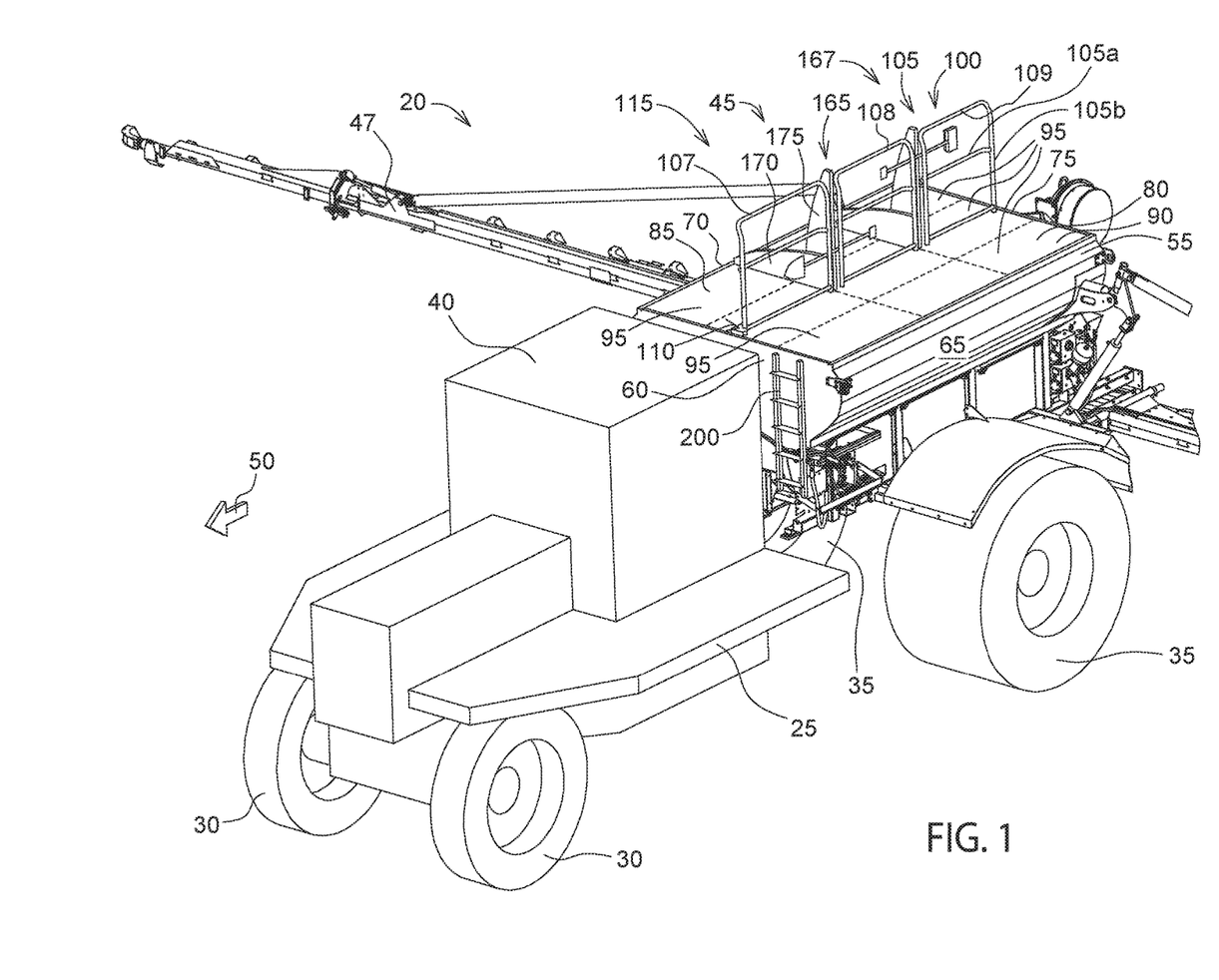
FIG. 1 is a simplified perspective view of a work vehicle in the form of a dry nutrient applicator, including a handrail system according to this disclosure.

In the segmented example shown in FIG. 1, there are three first rail members for each of the handrail portions 107, 108, 109 (nine in total), and two second rail members for each of the handrail portions 107, 108, 109 (six in total). In the one-piece example of FIG. 7, one may generally consider that there are nine first rail members and two second rail members, although in some cases the first and second rail members may be legs of the same rail component configured to extend in respective first and second directions.

Figure 7:
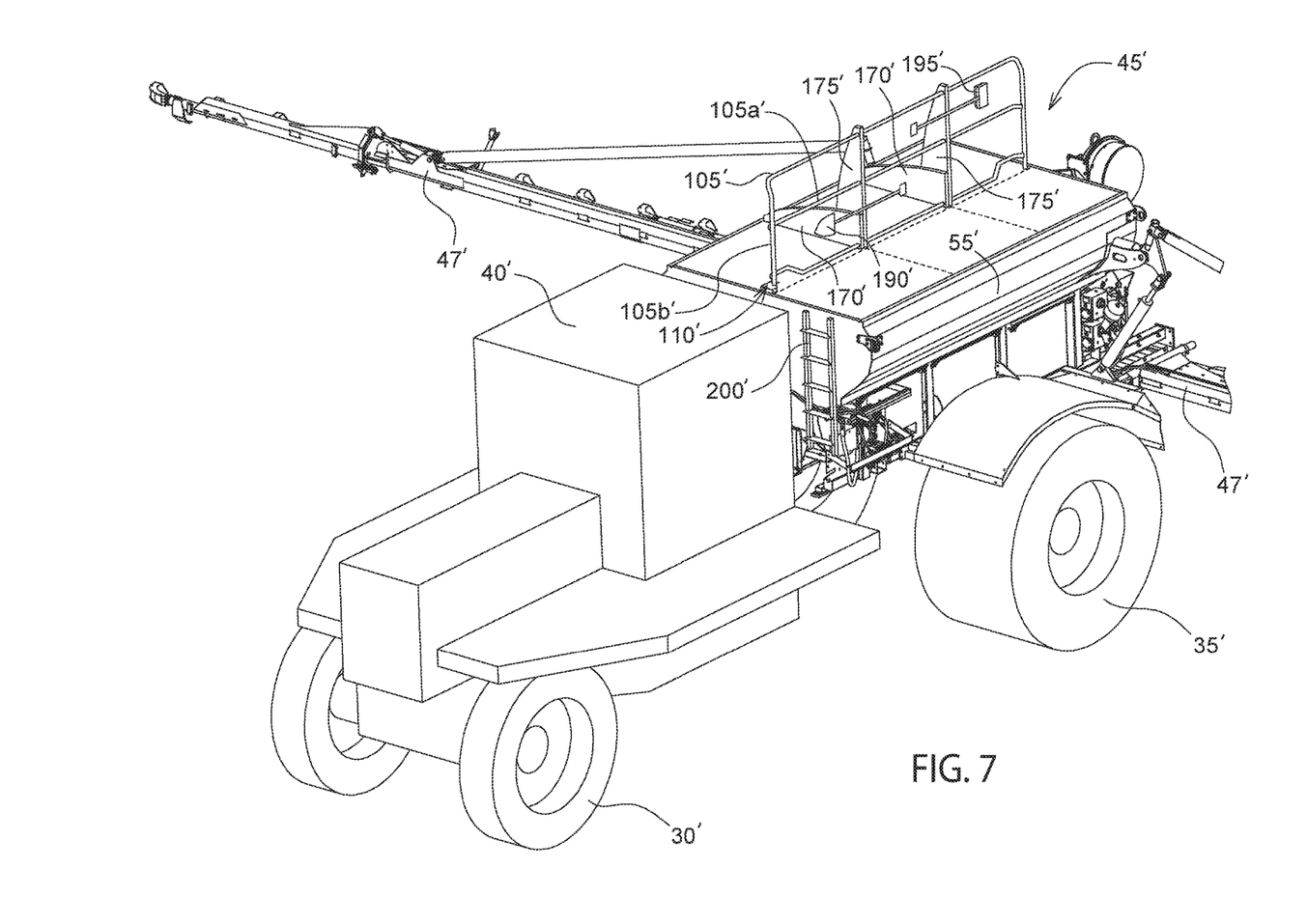
FIG. 7 is a simplified perspective view of a work vehicle in the form of a dry nutrient applicator, including a handrail system according to another embodiment.

The change in the handrail 105 orientation is provided by a fold structure 110 that pivotally couples the handrail 105 to the agricultural dry nutrient applicator 20, and in the illustrated example, specifically to the tank 55. Generally, the fold structure 110 is configured to move the handrail 105 between an upright position 115 (e.g., as shown in FIGS. 1 and 7) and a folded position 120 (e.g., as shown in FIGS. 4 and 10). In the illustrated examples, the fold structure 110 moves the handrail 105 to the folded position 120 by moving in the second direction, perpendicular to the travel direction 50 of the agricultural dry nutrient applicator 20.

The handrail 105 may be mounted to the agricultural dry nutrient applicator 20 at an elevated platform in various locations and orientations, including the front, rear or a lateral side of the agricultural dry nutrient applicator 20. The mounting location may affect the fold direction (e.g., parallel with or perpendicular to the travel direction 50) as well as the quantity of handrails 105 incorporated into the machine. As noted above, in the illustrated examples, the handrail 105 is mounted to the top side 80 of the tank 55 of the application system 45 in an orientation generally in-line with the travel direction 50. Further, the handrail 105 is positioned at or near the lateral center of the tank 55 (e.g., at or near the centerline of the agricultural dry nutrient applicator 20 between the various grates 95. In this way, in the upright position 115, a single handrail 105 may be used to provide support along the full-length of the tank 55 to a person standing upon the grates 95 or other parts of the agricultural dry nutrient applicator 20 when accessing the tank 55. Other advantages to such a center-mounted handrail 105 are discussed below.

Folding of the handrail 105 may be accomplished by various mechanisms, including the example fold structure 110 shown in the drawings. The fold structure 110 may be permanently mounted to the agricultural dry nutrient applicator 20. In the illustrated example, with reference to FIGS. 3A, 3B, 9A and 9B, the fold structure 110 has a detent 125 in communication with a biasing device that provides a ramp for the handrail 105 to pivotally move about and is configured to releasably bias the handrail 105 in the upright position 115. The illustrated biasing device is a spring 135. However, other biasing devices are contemplated by this disclosure. In other embodiments, various biased or unbiased hinges, linkages or other folding mechanisms may be included in the handrail system. Further, the illustrated embodiments include a single fold structure, although multiple fold structures arranged in alignment along a common axis may be included in the handrail system.

In some cases, such as in the illustrate examples, the folding of the handrail 105 may be accomplished under power or power-assistance. For example, the fold structure 110 may include an actuator 140 with a first end 145 pivotally coupled to the handrail 105 and a second end 150 pivotally coupled to the tank 55 of the application system 45 or other part of the agricultural dry nutrient applicator 20. The actuator 140 extends laterally to lower the handrail 105, and retracts to raise the handrail 105 to the upright position. The actuator 140 may be at least one of an electronic actuator (e.g., electric motor with a linear or rotary arm) and an extendable and retractable hydraulic cylinder. It should be noted that other mechanisms may be used to actuate the handrail 105 (e.g., various pneumatically powered devices), and that the handrail 105 may be unpowered and operated manually.

Referring again to FIGS. 1 and 7, the handrail system 100 may further include at least one divider 165. The divider 165 may have various uses, chiefly including that the divider 165 provides a partition wall or other separation between adjacent tanks or compartments of a single tank to aid in keeping different materials separated by reducing spill-over from one tank or compartment to another during various phases of operation (e.g., during tank filling). The divider 165 may also serve to accommodate a rigid or flexible covering (e.g., a tarp) (not shown) over its outer (upper when folded) edge 167 to protect the material contained in the tank 55 from the environment (e.g., rain, contaminants and so on).

The divider 165 may have various configurations and constructions. For example, the divider 165 may be generally triangularly-shaped, hemispherically-shaped, or the like, as shown in the illustrated examples. As further shown, the outer edge 167 of the divider 165 may constitute a support surface to serve the covering support function noted above. More specifically, the outer edge 167 may provide a rigid surface upon which a covering may rest when the handrail 105 is in the folded position 120. The tapered configuration (e.g., generally triangular or hemi-spherical shape) of the example divider 165 gives the outer edge 167 a decreasing height from or near the lateral center of the agricultural dry nutrient applicator 20 to or toward its lateral side or sides. This may facilitate run-off of liquid (e.g., rain or wash water) and reduce or prevent pooling on a flexible covering. Further, in some cases the divider 165 may include multiple parts, including one or more parts that are mounted in a fixed position relative to the agricultural dry nutrient applicator 20 and one or more parts that are movable relative to the agricultural dry nutrient applicator 20. For instance, in the illustrated examples, the divider 165 includes a first divider portion 170 coupled to the tank 55 of the application system 45 and a second divider portion 175 coupled to the handrail 105, and thus pivotal therewith with respect to the agricultural dry nutrient applicator 20. As shown in FIGS. 1 and 7, when the handrail 105 is in the upright position 115, the long dimension of the second divider portion 175 has an upright orientation at an angle (e.g., 90 degrees) with respect to the long dimension of the first divider portion 170, which remains fixed in a generally lateral orientation. When the handrail 105 is in the folded position 120, as shown in FIGS. 4 and 10, the long dimension of the second divider portion 175 extends in a generally lateral orientation, either aligned with, or slightly offset in the travel direction 50 from, the first divider portion 170. The first and second divider portions 170, 175 may be otherwise uncoupled or they may be connected via a suitable hinge or other pivotal connection. Together, the first and second divider portions 170, 175 combine to provide a crowned or tapered outer edge support surface that extends the full-width of the agricultural dry nutrient applicator 20 from one lateral side to the other, thereby fully partitioning the different materials and aiding in dispersing liquid off of the covering and away from the agricultural dry nutrient applicator 20.

The quantity and position of the divider 165 may vary for various work vehicle sizes and types. In the example embodiments of the agricultural dry nutrient applicator 20, there are two dividers 165, and thereby two pair of divider portions and two sets of support surfaces 167. In the segmented embodiment of the handrail 105 shown in FIG. 1, one divider 165 is positioned between the first handrail portion 107 and the second handrail portion 108, and the second divider is positioned between the second handrail portion 108 and the third handrail portion 109, each divider being coupled to either a first 105a or second 105b rail member of one or more handrail portions 107, 108, 109. In the example embodiment of FIG. 7, the second divider portions 175 form an integral part of the handrail 105 and effectively constitute two inner first rail members and connect to associated second rail members 105b, as illustrated.

In either construction (or others), during operation of the agricultural dry nutrient applicator 20 the handrail 105 may be placed in the folded position 120, which positions the dividers 165 in the laterally aligned (or slightly offset) position to help prevent material stored in the first compartment 85 from shifting over the grates 95 and into the second compartment 90. In addition, during storage or other operations of the agricultural dry nutrient applicator 20, when the handrail 105 is in the folded position 120, the dividers 165 may support a covering over its outer edge 167 to protect the material from the environment. During maintenance or other operations (e.g., moving stored material, mixing stored material, cleaning, replacing parts) of the agricultural dry nutrient applicator 20, the handrail 105 may be placed in the upright position 115, which in the example embodiments will also place the second divider portion 175 in the upright position. Repositioning the second divider portion 175 in this manner may serve to clear a walk path and otherwise reduce obstructions at the top side 80 of the tank 55 of the application system 45 to more readily accommodate maintenance tasks.

Figure 2:
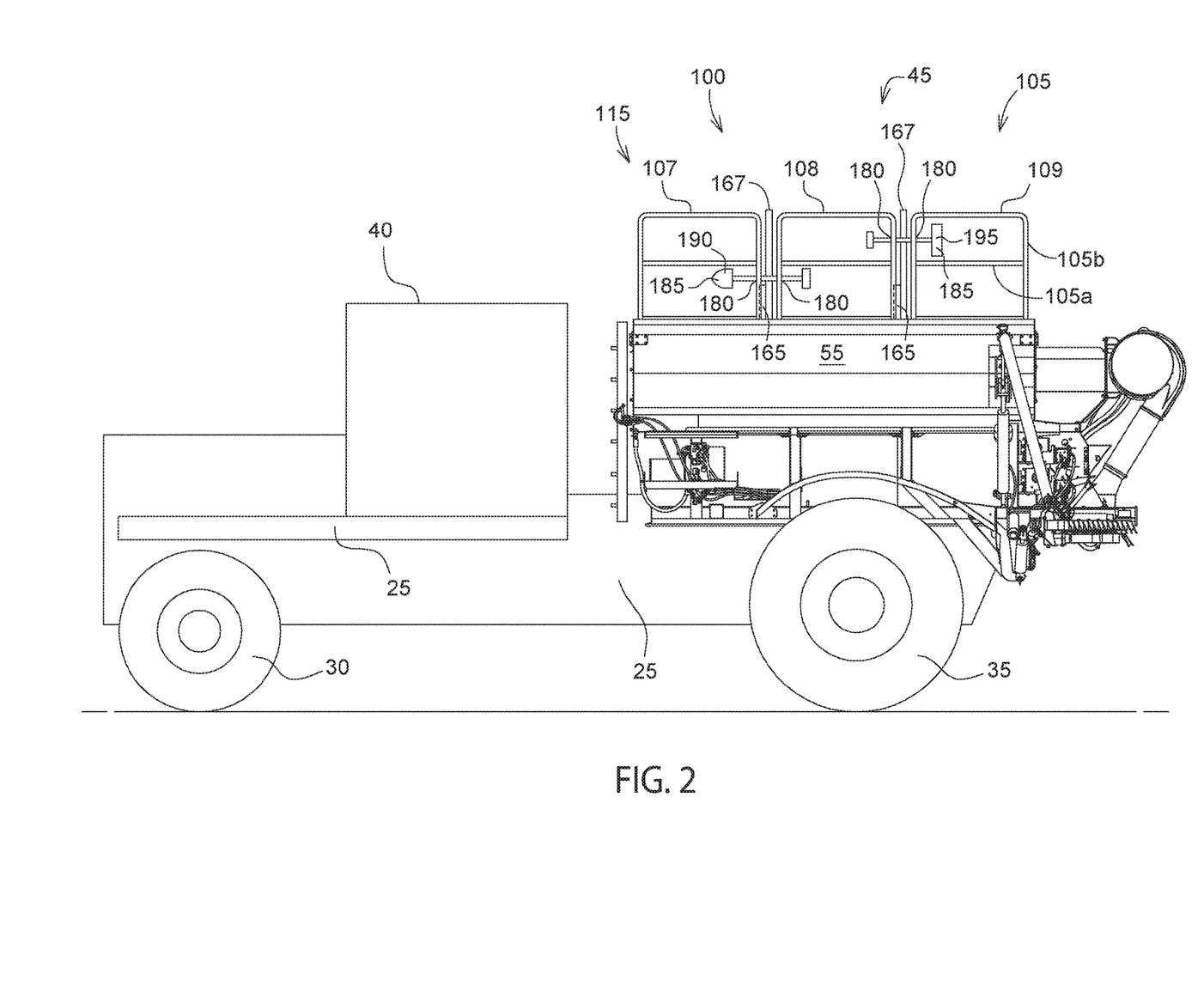
FIG. 2 is a side view thereof with the handrail system in an upright position.
Figure 3A:
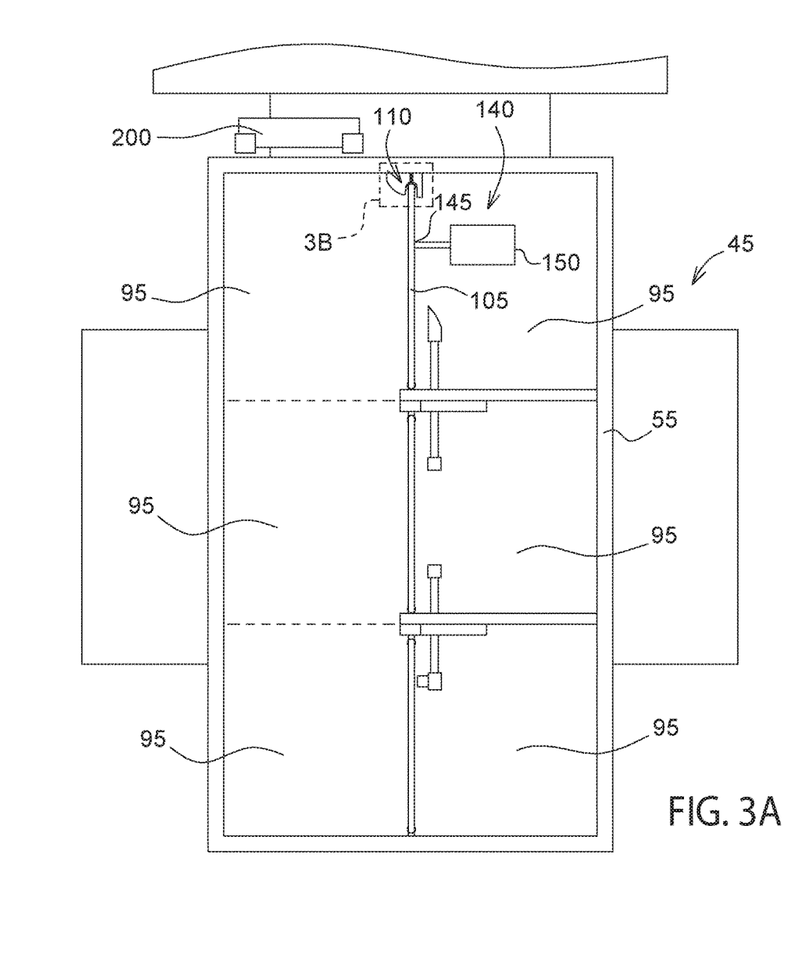
FIG. 3A is a partial top view thereof.
Figure 3B:
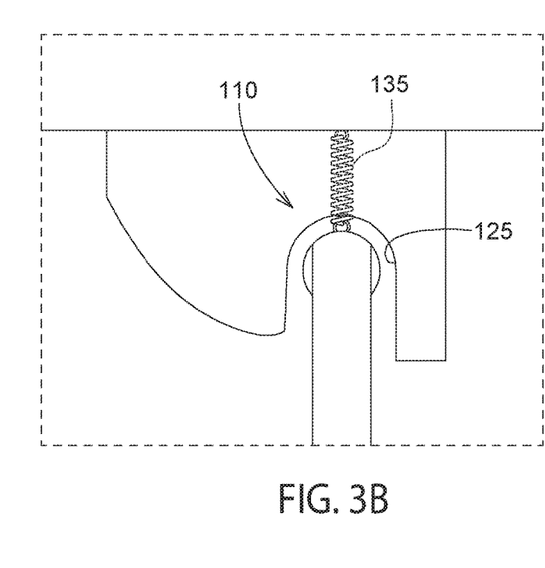
FIG. 3B is an enlarged detail view of area 3B in FIG. 3A.
Figure 8:
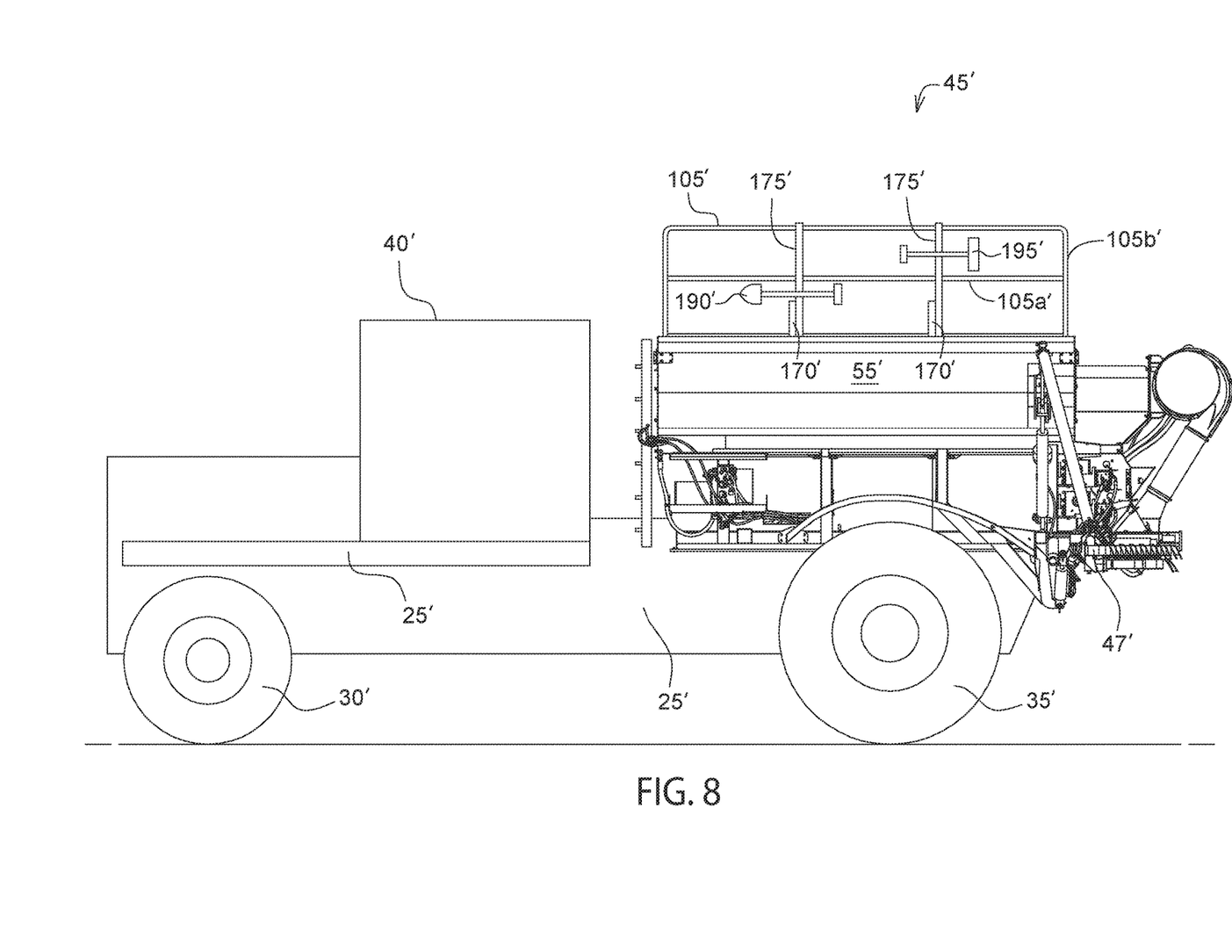
FIG. 8 is a side view of thereof with the handrail system in an upright position.
Figure 9A:
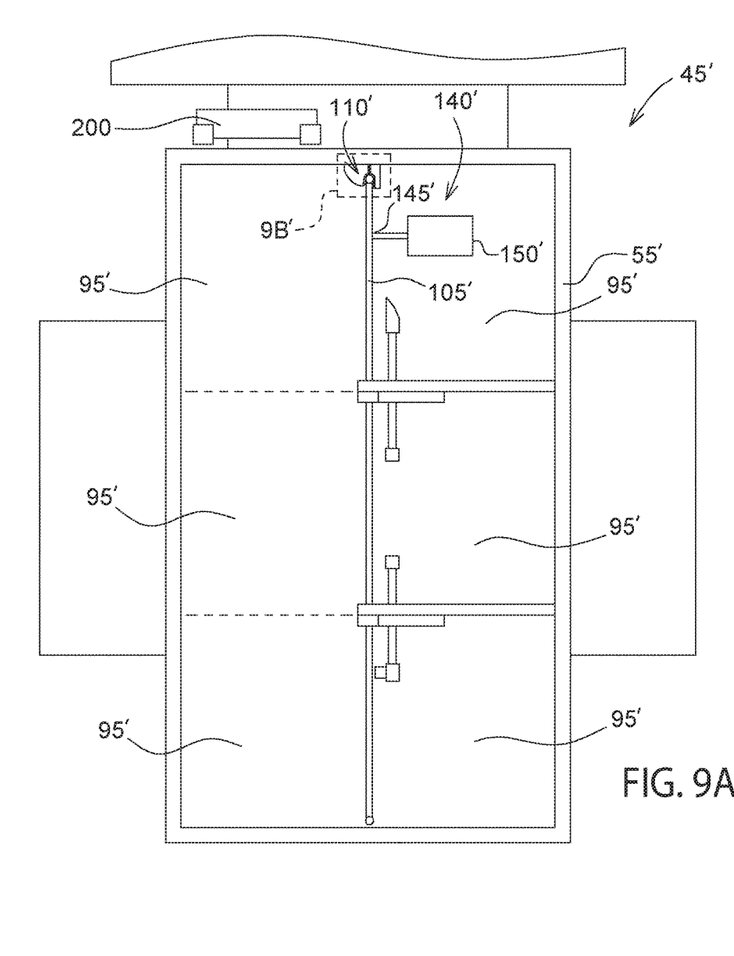
FIG. 9A is a partial top view thereof.
Figure 9B:
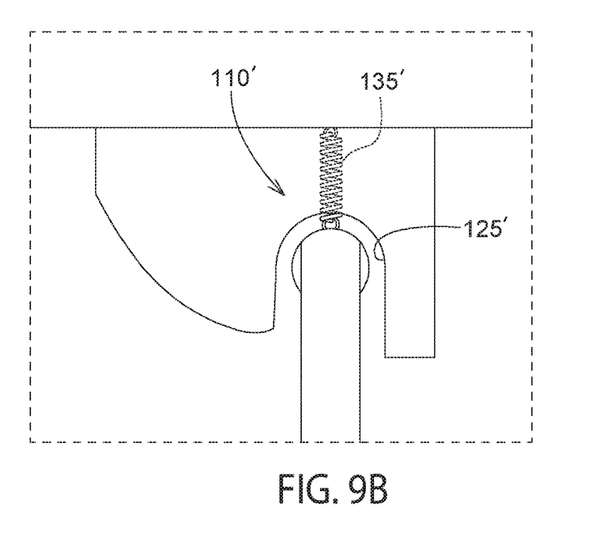
FIG. 9B is an enlarged detail view of area 9B in FIG. 9A.

Additionally, in various configurations, one or more attachment devices may be coupled to the handrail 105. For example, as shown in FIGS. 2 and 8, an attachment device 180 may be a hook or other device (e.g., clamp, hook and loop and so on). The attachment device 180 is configured to removably couple a tool 185 and/or one or more of the grates 95 to the handrail 105. The illustrated examples show the tools as a shovel 190 and a broom 195. However, other tools 185 are contemplated by this disclosure. The grates 95 that are removed from the tank 55 and various tools 185 may be stored on the handrail 105 to more easily accommodate maintenance or other tasks. The handrail system 100 may also include at least one ladder 200 mounted to the agricultural dry nutrient applicator 20, such as coupled to the tank 55 of the application system 45, to provide access to the top side 80 of the application system 45, as illustrated. Additional ladders may be used or mounted in other locations on the agricultural dry nutrient applicator 20.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described to best explain the principles of the disclosure and their practical application, and to enable others of ordinary skill in the art to understand the disclosure and recognize many alternatives, modifications, and variations on the described example(s). Accordingly, various implementations other than those explicitly described are within the scope of the claims.

What is claimed is:

1. A handrail system for a work vehicle, comprising:
   a handrail including a first rail member configured to extend in a first direction and a second rail member coupled to the first rail member and configured to extend in a second direction substantially perpendicular to the first direction; and
   a fold structure configured to couple the handrail to the work vehicle and move the handrail between an upright position and a folded position with respect to the work vehicle;
   wherein, when in the folded position, the handrail has a support surface that is elevated along a central area of the handrail higher than at least one side of the handrail;
   wherein the support surface is an edge of a planer wall, the planer wall mounted to at least one of the first and second rail members and extending in the second direction and in a third direction at an angle to the first and second directions.

2. The handrail system of claim 1, wherein, when the fold structure is configured to be coupled to the work vehicle, such that the first rail member extends in the first direction substantially in line with a direction of travel of the work vehicle, and the second direction in which the second rail member extends, when in the folded positioned, extends substantially between lateral sides of the work vehicle; and wherein the central area of the handrail is laterally between the lateral sides of the work vehicle.

3. The handrail system of claim 1, wherein the planner wall is a divider.

4. The handrail system of claim 3, wherein the edge of the divider is one of inclined and curved in the second direction such that, when in the folded position, the support surface has a decreasing height in the second direction.

5. The handrail system of claim 3, wherein there are a plurality of first rail members spaced apart in the second direction and a plurality of second rail members spaced apart in the first direction; and wherein there are a plurality of dividers, at least one of which is arranged between consecutive second rail members with respect to the first direction.

6. The handrail system of claim 1, further comprising an attachment device coupled to at least one of the first and second rail members and configured to removably couple at least one of a tool and a grate to the handrail.

7. The handrail system of claim 1, wherein the fold structure includes an actuator having a first end pivotally coupled to at least one of the first and second rail members and a second end configured to pivotally couple to the work vehicle; and wherein the actuator is at least one of an electronic actuator and an extendable and retractable hydraulic cylinder.

8. The handrail of claim 1, wherein the fold structure includes a detent in communication with a biasing device configured to releasably bias the handrail in the upright position when connected to the work vehicle.

9. A work vehicle, comprising:
a vehicle frame;
a platform mounted at a top side of the vehicle frame; and
a handrail system positioned near the platform and including:
a handrail including a first rail member extending in a first direction and a second rail member coupled to the first rail member and extending in a second direction substantially perpendicular to the first direction; and
a fold structure configured to move the handrail between an upright position and a folded position with respect to the work vehicle;
wherein, when in the folded position, the handrail has a support surface that is elevated along a central area of the handrail higher than at least one side of the handrail; wherein the support surface is an edge of a planer wall, the planer wall mounted to at least one of the first and second rail members and extending in the second direction and in a third direction at an angle to the first and second directions.

10. The work vehicle of claim 9, wherein the first rail member extends in the first direction substantially in line with a direction of travel of the work vehicle, and the second direction in which the second rail member extends, when in the folded positioned, extends substantially between lateral sides of the work vehicle; and wherein the central area of the handrail is laterally between the lateral sides of the work vehicle and the fold structure moves the handrail perpendicular to the direction of travel.

11. The work vehicle of claim 10, wherein the work vehicle includes a material application system including a tank; and wherein the handrail is positioned substantially along the center of the tank.

12. The work vehicle of claim 11, wherein the platform is a grate for covering an opening of the tank.

13. The work vehicle of claim 10, wherein the fold structure includes an actuator having a first end pivotally coupled to at least one of the first and second rail members and a second end pivotally coupled to the work vehicle; and wherein the actuator is at least one of an electronic actuator and an extendable and retractable hydraulic cylinder.

14. The work vehicle of claim 10, wherein the fold structure includes a detent in communication with a biasing device configured to releasably bias the handrail in the upright position with respect to the work vehicle.

15. The handrail system of claim 10, wherein the planner wall is a divider.

16. The work vehicle of claim 15, wherein the edge of the divider is one of inclined and curved in the second direction such that, when in the folded position, the support surface has a decreasing height in the second direction.

17. The work vehicle of claim 15, wherein the divider has a first divider portion and a second divider portion;

wherein the first divider portion is fixed with respect to the work vehicle and the second divider portion is mounted to at least one of the first and second rail members and is movable with the handrail with respect to the work vehicle.

18. The work vehicle of claim 17, wherein there are a plurality of first rail members spaced apart in the second direction and a plurality of second rail members spaced apart in the first direction; and wherein there are a plurality of dividers, at least one of which is arranged between consecutive second rail members with respect to the first direction and extends between lateral sides of the work vehicle.

* * * * *